INVENTORS
CHARLES R. PROCTER
JOHN F. NEESE
LOUIS BLEDSTEIN
BY
ATTORNEYS.

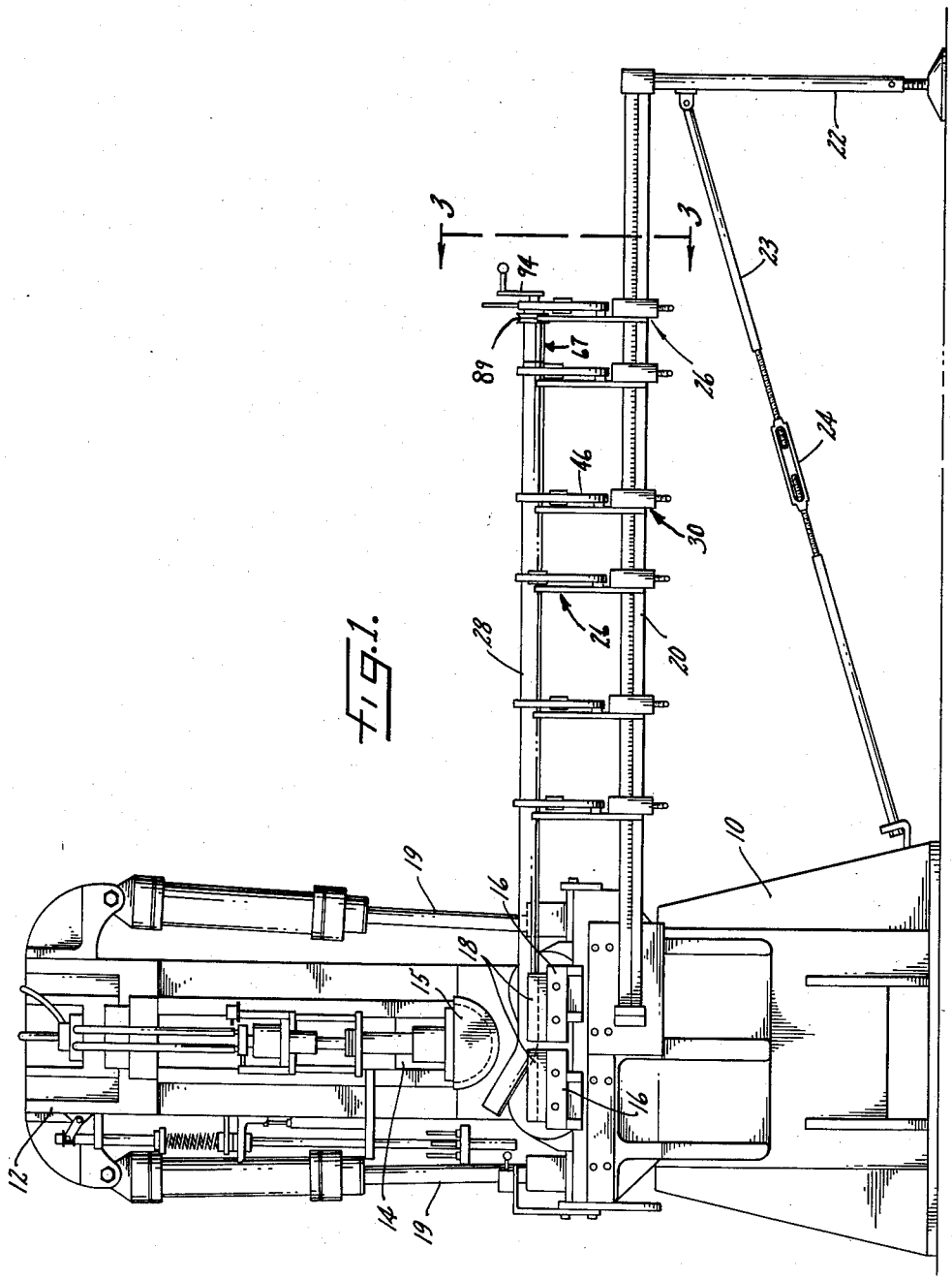

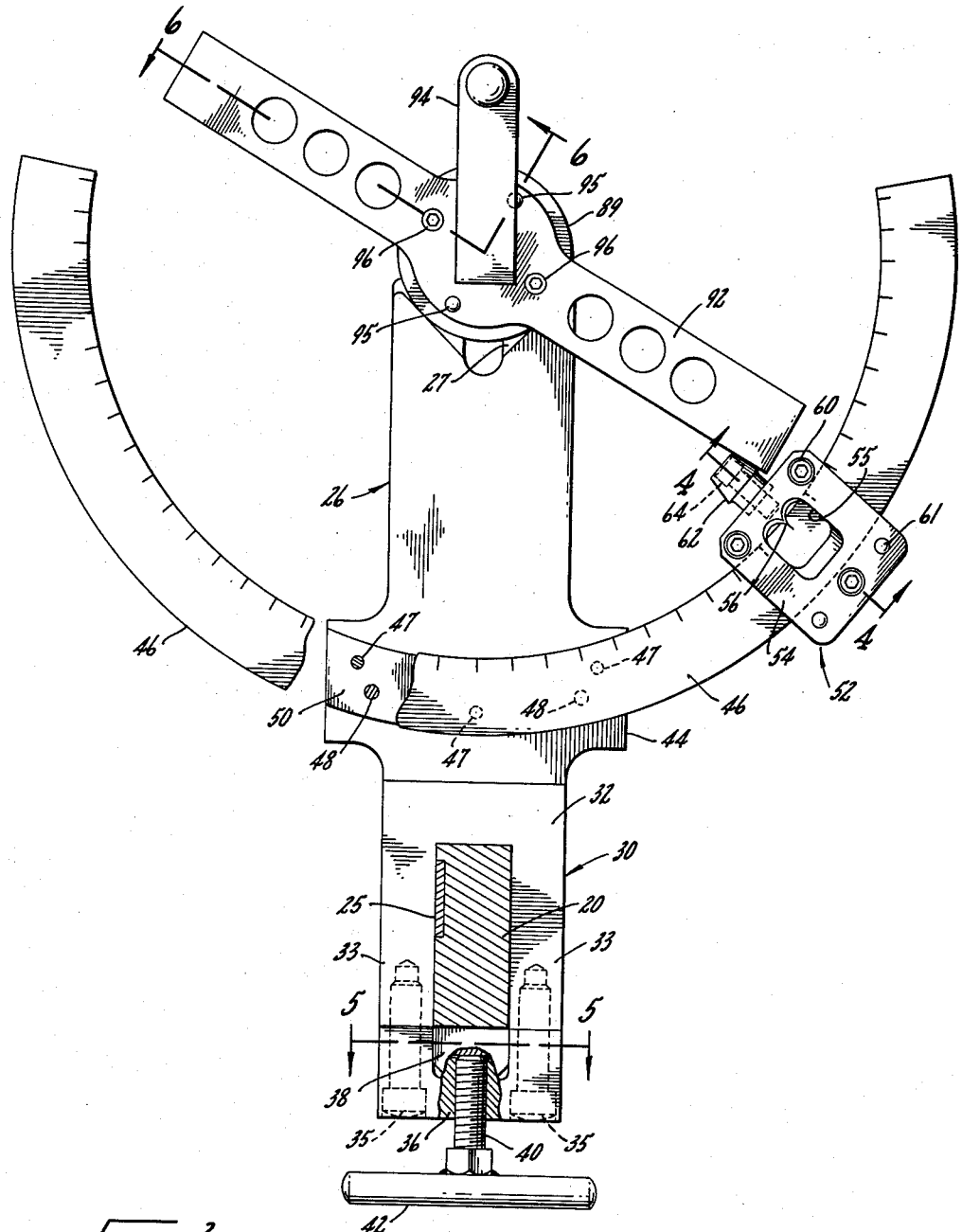

Jan. 7, 1964     C. R. PROCTER ETAL     3,116,779
APPARATUS FOR LOCATING PIPE BENDS
Filed July 17, 1962     4 Sheets-Sheet 4
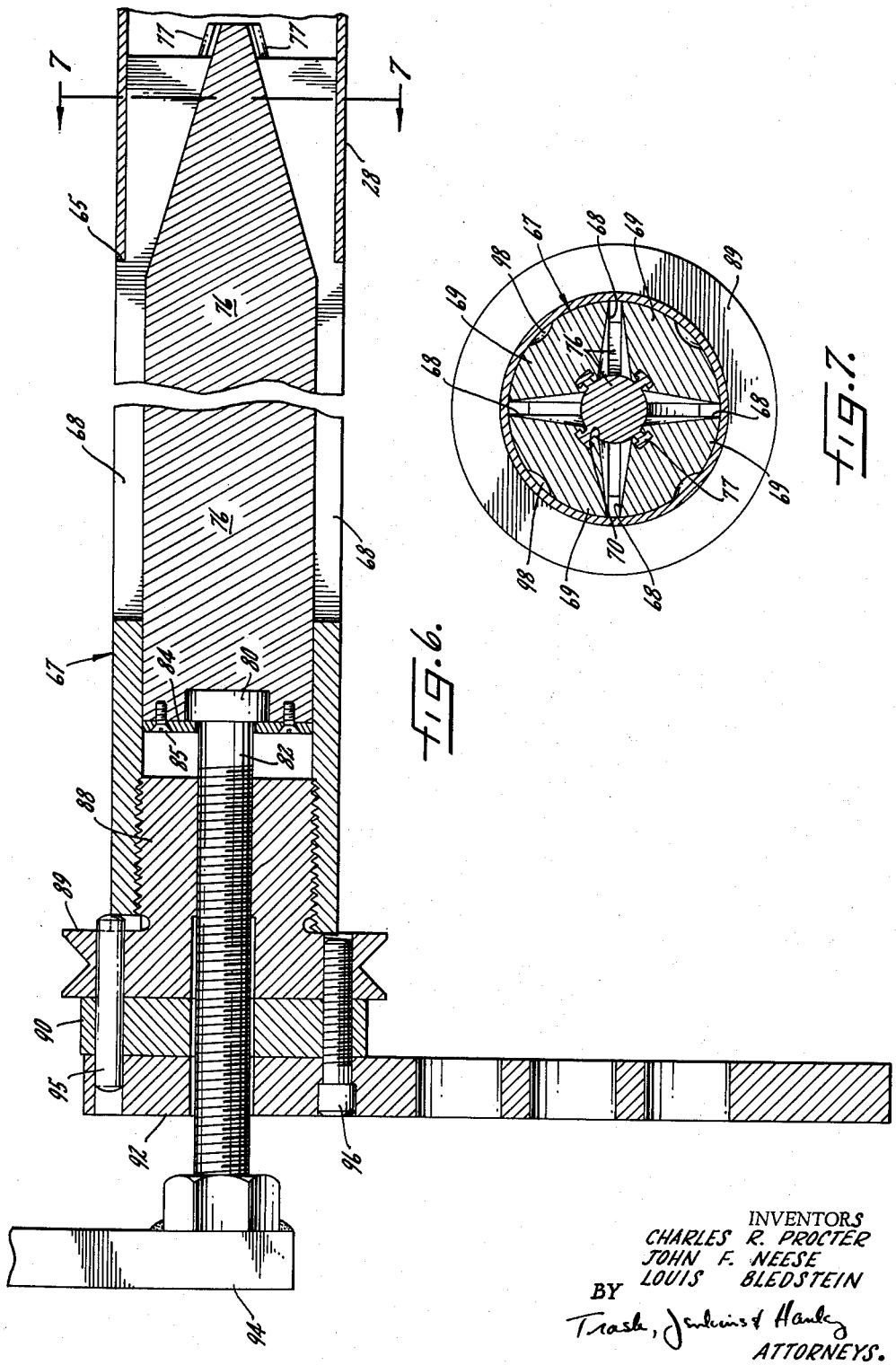
INVENTORS
CHARLES R. PROCTER
JOHN F. NEESE
LOUIS BLEDSTEIN
BY
ATTORNEYS.

United States Patent Office
3,116,779
Patented Jan. 7, 1964

3,116,779
APPARATUS FOR LOCATING PIPE BENDS
Charles R. Procter, Franklin, John F. Neese, Greenwood, and Louis Bledstein, Indianapolis, Ind., assignors to Arvin Industries, Inc., a corporation of Indiana
Filed July 17, 1962, Ser. No. 210,496
9 Claims. (Cl. 153—21)

This invention relates to an apparatus for locating the bends to be formed in a length of pipe, and more particularly to an apparatus adapted to be used in association with a pipe bending machine for axially and rotatably locating said pipe with respect to said bending machine.

It is an object of our invention to provide an apparatus for locating pipe bends which can be used in association with a conventional pipe bending machine, which will accurately locate the angular orientation of a plurality of bends in a pipe through a complete 360° angle, which will accurately locate the axial positioning of a plurality of bends in a pipe throughout substantially the entire length of said pipe, and which can be quickly and easily set up and operated by semi-skilled personnel.

Our invention is adapted to be used in association with a conventional pipe bending machine employing an arcuate punch movable into engagement with the pipe supported on a pair of movable dies for forming a bend in said pipe.

In the preferred form of our invention, we mount an elongated beam on said bending machine and projecting outwardly therefrom. Desirably, said beam is mounted on the machine in alignment with the plane of the punch movement. A plurality of supports are connected to slides slidably carried on the beam and project outwardly from said beam with their ends remote therefrom disposed in coplanar relationship. The beam is provided with an indicia scale so that the slides may be accurately positioned on said beam to dispose the supports at the desired distances from the bending axis formed by the pair of dies and punch. Conveniently, each of said slides is provided with clamping means for locking it and its associated support in the desired position on said beam. Operatively connected to each of the supports is a protractor upon which a stop is slidably mounted, said stop being slidably adjustable about the complete arc of the protractor.

In order to locate a pipe on the supports and protractors in the desired position relative to the punch and movable dies, a pipe gripping element is releasably mounted in one end of said pipe. Conveniently, said element comprises an expandable sleeve inserted into one end of said pipe and carrying an arbor axially movable into engagement with said sleeve to expand it outwardly into binding engagement with the inner walls of the pipe. The arbor is moved axially with respect to said sleeve by means operatively connected to said sleeve through a first member selectively engageable with the ends of said supports remote from the beam and a second member selectively engageable with the stops on the protractors, whereby said first member and said supports will axially locate said pipe relative to the bending machine and said second member and said stops will dispose said pipe in the desired position of rotation relative to said bending machine.

Thus, with said gripping element operatively connected to a length of pipe, the pipe is placed on the supports with said first member engaging the support most remote from the bending machine and said second member engaging the stop on the protractor on said most remote support. The first bend is then formed in the pipe, and after such bending, the pipe is advanced toward the bending machine and rotated about its axis to cause said first member to engage the next adjacent support and said second member to engage the stop on the protractor associated with said adjacent support. The sequence is repeated with the pipe being advanced axially and angularly rotated in the pattern determined by the longitudinal spacing between the supports and the positioning of the stops on the protractors.

Other objects and features of our invention will become apparent from the more detailed description which follows and from the accompanying drawings, in which:

FIG. 1 is a front elevation of a conventional pipe bending machine with a bend locating apparatus embodying our invention being used in association therewith;

FIG. 3 is an enlarged vertical section taken on the line 3—3 of FIG. 1;

FIG. 6 is a horizontal section taken on the line 6—6 of FIG. 3 and showing the expandable pipe insert; and FIG. 7 is a vertical section taken on the line 7—7 of FIG. 6.

Figure 4:
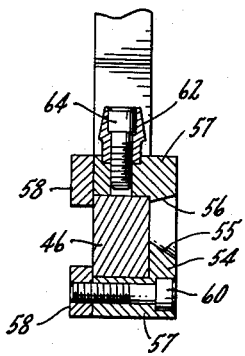
FIG. 4 is a vertical section of the protractor stop taken on the line 4—4 of FIG. 3.

Our invention is concerned with an apparatus for use in association with a conventional pipe bending machine to axially and angularly locate a plurality of bends formed in a length of pipe by said machine. In the drawings, our invention is shown as being used in association with an offset ram pipe bending machine such as is manufactured and sold by the Pines Engineering Co., Inc. Such machine normally comprises a base 10 having a frame 12 projecting upwardly therefrom. A hydraulically actuated ram 14 having a punch 15 mounted thereon is carried on the frame 12 and is vertically movable with respect to a pair of pivotally mounted rocker shoes 16 mounted on the base 10. As shown in FIG. 1, the rocker shoes 16 support a pair of horizontally aligned wing dies 18 in the general vertical plane of the punch 15, said rocker shoes and dies being releasably retained in horizontal alignment by a pair of rams 19. In normal operation, the punch 15 is vertically movable into operative engagement with a pipe carried on the dies 18 so that upon downward movement of the ram 14 said punch will bear against the pipe carried in the dies for bending it about the radius of curvature of said punch.

In the manufacture of many types of pipe, such as for example, exhaust pipes and tail pipes used in automotive exhaust systems, it is necessary that the pipe be bent at various axial positions along its length with said bends being formed at various angular orientations with respect to each other about the pipe axis. Our invention is concerned with an apparatus for locating a length of pipe relative to a bending machine to insure that the bends formed in said pipe by said machine are located at the desired axial positions and angular orientations.

As shown in the drawing, our invention comprises an elongated rectangularly cross-sectioned beam 20 having a length longer than the longest length of pipe to be bent and operatively connected to the bending machine in alignment with the vertical plane of the punch 15. To this end, one end of the beam 20 is rigidly connected to a plate mounted on the base 10, with the opposite end of said beam projecting outwardly from the bending machine and supported on an adjustable vertically extending leg 22, said leg being adjustable to dispose the beam 20 in parallelism with the pipe-supporting faces of the dies 18. Conveniently, the beam 20 is further stabilized by a brace 23 having a turn-buckle 24 and extending from the end of the beam 20 supported on the leg 22 to the bending machine base 10. For reasons that will become more apparent hereinafter, the beam 20 is provided with a reference scale 25, conveniently in the form of an inlaid key, and constituting a measure of the linear distances between various points along the beam and the center axes of the punch 15 and dies 18.

Figure 5:
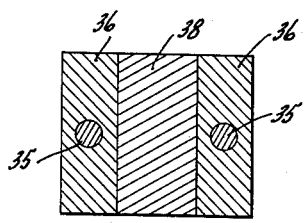
FIG. 5 is a horizontal section taken on the line 5—5 of FIG. 3.
Figure 2:
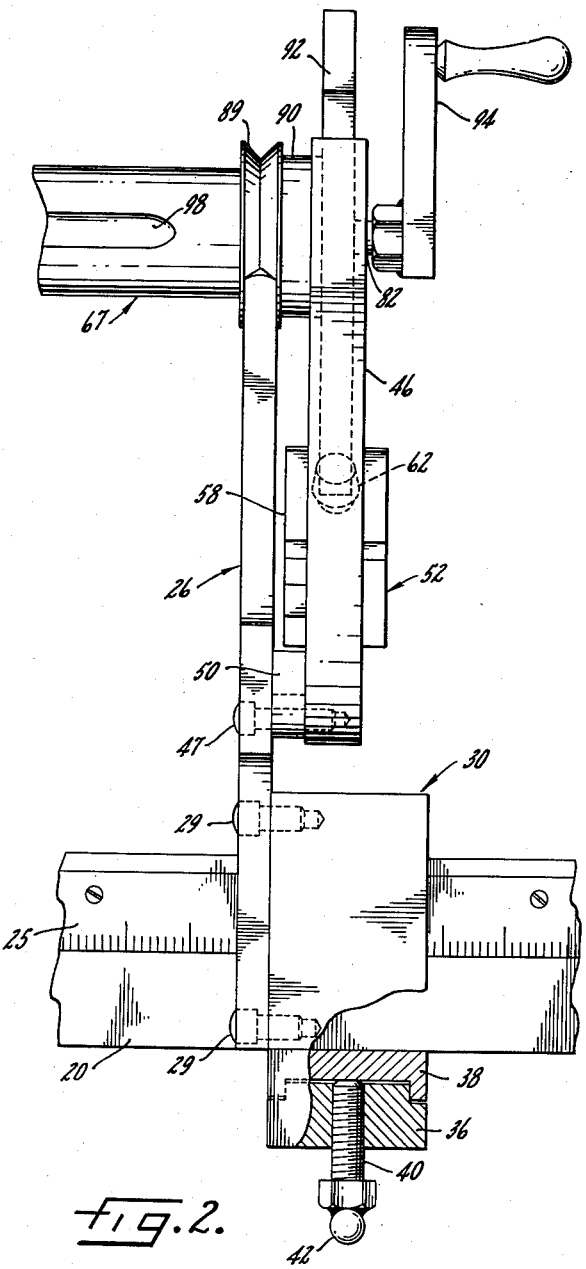
FIG. 2 is an enlarged fragmentary side view of one of the pipe supports shown in FIG. 1.

A plurality of pipe locating and supporting members are adjustably carried on the beam 20, and since each of said members is identical in its construction and operation, only one of such members will be described. Each of said members comprises a support 26 projecting upwardly from the beam 20 and having its upper end provided with a generally V-shaped groove 27 in which a pipe 28 is cradled, the edges of said groove being beveled to provide an upwardly presented knife edge. The lower end of the support 26 is connected, as by bolts 29, to a generally U-shaped slide 30 slidably received over the beam 20. The slide 30 includes a pair of legs 33 abutting the side faces of the beam and interconnected at one of their ends to a bight 32 supported on the upper beam face. As shown in FIGS. 3 and 5, the opposite ends of said legs 33 are connected, as by bolts 35, to a cap 36 having a recessed portion intermediate the slide legs 33 for the reception of a shoe 38 interposed between the cap 36 and the lower face of the beam 20. The slide 30 and shoe 38 are releasably retained in binding engagement with the beam 20 by a threaded stud 40 extending upwardly through a tapped opening in the cap 36 to bear against the downwardly presented face of the shoe 38, the end of the stud 40 projecting downwardly from the cap 36 being connected to a hand wheel 42. Thus, upon rotation of the hand wheel 42, the shoe 38 is backed away from binding engagement with the beam 20 so that the slide 30 may be moved along the beam 20 to dispose the support 26 at the desired distance from the vertical axes of the punch 15 and dies 18.

Intermediate its upper and lower ends, the support 26 is provided with integral laterally extending wings 44 to which an arcuate protractor 46 is mounted, as by bolts 47 and pins 48. The protractor 46 is mounted on the support 26 with its open end presented upwardly and is scaled in degrees along its inwardly presented edge. Conveniently, the protractor 46 has an arcuate length slightly greater than 180°. Said protractor is interconnected to the support 26 along the face of said support remote from the bending machine and is spaced from said support by an arcuate spacer 50 interposed between the protractor and support and retained in fixed position therebetween by the bolts 47 and pins 48.

As shown in FIGS. 3 and 4, an angle indicator 52 is carried on the protractor 46. Said indicator comprises a face plate 54 having an opening 55 formed therein, with one edge of said opening constituting a pointer 56 adapted to register with the protractor scale. A pair of legs 57 project outwardly from the face plate 54 and are provided with opposed arcuate faces slidably carried against the inwardly and outwardly presented faces of the protractor 46 by a pair of brackets 58 mounted on the legs 57, as by bolts 60 and pins 61. The opposed faces of the brackets 58 are spaced apart a distance less than the thickness of the protractor 46 to thus dispose said brackets in abutting engagement with the protractor face opposite the face engageable with the face plate 54 for retaining the indicator 52 on said protractor. The spacer 50 has a width less than the distance between the opposed edges of the brackets 58 so that the indicator may be slid along the entire arcuate length of the protractor 46, including movement through the arcuate extent of said spacer. A stop 62 is mounted on the upwardly presented face of the indicator 52 in alignment with the pointer 56 as by a bolt 64 extending through said stop and into a tapped opening formed in said indicator.

In order for the pipe 28 to come into proper register with the supports 26 and the angularly oriented stops 62 it is necessary that said pipe be provided with means releasably retaining it in operative association with said supports and stops. To this end, we provide a coupler as illustrated in FIGS. 6 and 7 which is insertable into one end of the pipe 28. Said coupler comprises an elongated sleeve 67 having a plurality of slots 68 extending axially inwardly from one of its ends which is shouldered, as at 65, to provide that shouldered end with a plurality of elongated segments 69. Each of said segments has an inwardly presented tapered thrust-receiving face 70 provided with an axially extending T-shaped keyway.

Carried within the sleeve 67 is an elongated arbor 76 having a plurality of radially projecting T-shaped keys 77 slidably received in the keyways formed in the segments 69. The end of the arbor adjacent the shouldered sleeve end 65 has a tapered configuration and is disposed in thrust-engaging relationship with the segment faces 70. The opposite end of the arbor 76 has an axially disposed opening in which the expanded end 80 of an elongated screw 82 is received. The screw end 80 is rotatably connected to the arbor 76 by an annular plate 84 mounted on the arbor, as by screws 85, with the inwardly presented edge of said plate bearing against the end 80 of the screw 82. A hub 88 is threadably received in the end of the said sleeve opposite the segments 69 and is integrally connected to a wheel 89 having a diameter larger than the diameter of the pipe 28 and provided with an annular extending groove adapted to mate with the knife edged upper ends 27 of the supports 26. The screw 82 extends through a tapped opening in the hub 88 with its inner end connected to the arbor 76 in the manner previously described and with its opposite or outer end projecting through the wheel 89 being rigidly connected to a hand wheel 94. Mounted on the screw 82 between the hand wheel 94 and the wheel 89 are a spacer 90 and cross arm 92 rigidly interconnected to each other and to the wheel 89 by pins 95 and bolts 96, at least one of said pins 95 being received in a keyway in the sleeve 67 for preventing the hub 88, spacer 90 and cross arm 92 from rotating with respect to said sleeve.

The operation of the coupler may be described as follows. The sleeve 67 is inserted into the end of the pipe 28 until the end of said pipe abuts the shoulder 65. The hand wheel 94 is then rotated to thus cause the screw 82 to be moved axially inwardly with respect to the cross arm 92 and hub 88 to move the arbor 76 axially with respect to said sleeve, as to the right in FIG. 6. During such axial movement of the arbor 76, its tapered end will engage the thrust-receiving faces 70 on the sleeve segments 69 to cause said segments to move radially outwardly in binding engagement with the inwardly presented faces of the pipe, such expanding movement of the segments 69 being facilitated as by said segments being weakened by recesses 98 formed in their outwardly presented faces. To remove the coupler from the pipe, the hand wheel 94 is simply rotated in an opposite direction to cause the end 80 of the screw 82 to bear against the plate 84 for pulling the tapered arbor end out of thrust-transmitting engagement with the tapered sleeve face 70, whereby the sleeve segments 69 will be pulled radially inwardly out of binding engagement with the pipe by the keys 77 to thus permit said coupler to be withdrawn from the end of the pipe.

In bending a length of pipe, there are four factors to be considered; the radius of curvature of the bends to be formed, the depth of said bends, the axial spacing between said bends, and the angular orientation of said bends about the axis of the pipe. The radius of curvature of the bends and the depth of said bends are controlled by the selection of the punch 15 and by controlling the vertical travel of said punch, respectively. The axial spacing between said bends and their angular orientation, however, are controlled by the longitudinal spacing of the supports 26 along the beam 20 and by the positioning of the stops 62 on the protractors 46, respectively.

Thus, in setting up our apparatus and running a pipe through the bending machine, the coupler is inserted into the pipe to be bent and bindingly retained against the inner walls thereof in the manner previously described. The slides 30 for the several supports 26 are moved along the beam 20 into the desired positions with the support most remote from the bending machine being located from the vertical axes of the punch 15 and dies 18 a distance equal to the distance between the center of the first bend to be formed in the pipe and the wheel 89 on the coupler which is inserted in the pipe; the next most remote support being spaced from said most remote punch a distance equal to the distance between the centers of the first and second bends to be formed in the pipe; etc. The indicator 52 on each of the protractors 46 is adjusted to dispose its stop 62 at the desired angular orientation. With the supports disposed in the desired longitudinally spaced relationships and the indicators 52 disposed in the desired angular orientations, the pipe is laid upon the coplanar upper ends 27 of the several supports 26 with the wheel 89 of the coupler resting on the upper end of the support most remote from the bending machine and the cross arm 92 engaging the stop 62 on the protractor mounted on said most remote support. This places the pipe in position for the punch 15 to make the first bend in said pipe. After said first bend is made, the pipe is advanced to cradle the wheel 89 on the end 27 of the next most remote support 26 from the bending machine, and is rotated so that the cross arm 92 engages the stop 62 on the protractor mounted on said support to thus properly position the pipe under the punch 15 for forming the second bend in said pipe. The pipe is advanced in this manner along the several supports and protractors until all of the bends have been formed therein, after which the coupler is removed from said pipe in the manner previously described and the operation is repeated with the next pipe to be bent.

We claim as our invention:

1. An apparatus for use in association with a pipe bending machine for locating a plurality of bends in a length of pipe, comprising
   (a) an elongated beam projecting outwardly from said machine,
   (b) a plurality of pipe supports adjustably slidable along said beam and projecting outwardly therefrom.
   (c) a protractor mounted on each of said supports and having stop means adjustably mounted thereon, and
   (d) means releasably retained in a fixed position on one end of said pipe and provided with a first member selectively engageable with said supports for axially locating said pipe with respect to said machine and a second member selectively engageable with the stop means on said protractors for angularly orienting said pipe with respect to said bending machine.

2. An apparatus as set forth in claim 1 in which said means, comprises
   (a) an expandable sleeve releasably carried in one end of said pipe,
   (b) an arbor carried within said sleeve and axially movable in one direction to bear against said sleeve for expanding said sleeve against the inner wall of said pipe and movable in opposite direction for movement of said sleeve away from said walls,
   (c) a wheel mounted on one end of said sleeve and projecting outwardly from said pipe for engagement with said supports,
   (d) a cross arm operatively connected to said wheel and projecting radially therebeyond for engagement with said stop means, and
   (e) means for moving said arbor axially in said sleeve.

3. An apparatus as set forth in claim 2 with the addition that
   (a) said wheel and said supports are provided with mating faces for releasably retaining said wheel in a fixed axial position on said supports.

4. An apparatus as set forth in claim 2 with the addition that
   (a) said wheel is connected to a hub threadably received in said sleeve, and
   (b) said means for moving said arbor comprises a bolt threadably received in an opening in said hub with one of its ends extending outwardly therefrom through said cross arm and wheel and its opposite end extending inwardly from said hub and operatively connected to said arbor.

5. An apparatus for use in association with a pipe bending machine for locating a plurality of bends in a length of pipe, comprising
   (a) an elongated beam projecting outwardly from said machine,
   (b) a plurality of pipe supports adjustably slidable along said beam and having their ends remote from said beam disposed in coplanar relationship,
   (c) an arcuate protractor mounted on each of said supports with its open end presented away from said beam,
   (d) stop means adjustably slidable on each of said protractors and extending inwardly therefrom, and
   (e) means releasably retained in a fixed position on one end of said pipe and provided with a first member selectively engageable with said supports for axially locating said pipe with respect to said machine and a second member selectively engageable with the stop means on said protractors for angularly orienting said pipe with respect to said bending machine.

6. An apparatus for use in association with a pipe bending machine for locating a plurality of bends in a length of pipe, comprising
   (a) an elongated beam having a rectangular cross-section and projecting outwardly from said machine,
   (b) a plurality of generally U-shaped slides slidably carried on said beam.
   (c) a cap mounted on each of said slides and carrying binding means releasably engageable with said beam for releasably retaining said slide in the desired position of adjustment along said beam,
   (d) a plurality of supports mounted on said plurality of slides for movement therewith with their ends remote from said beam in coplanar relationship,
   (e) an arcuate protractor mounted on each of said supports with its open end presented away from said beam,
   (f) stop means adjustably slidable on each of said protractors and extending inwardly therefrom, and
   (g) means releasably retained in a fixed position on one end of said pipe and provided with a first member selectively engageable with said supports for axially locating said pipe with respect to said machine and a second member selectively engageable with the stop means on said protractors for angularly orienting said pipe with respect to said bending machine.

7. An apparatus for use in association with a pipe bending machine for locating a plurality of bends in a length of pipe, comprising
   (a) an elongated beam projecting outwardly from said machine
   (b) a plurality of pipe supports adjustably slidable along said beam and having their ends remote from said beam disposed in coplanar relationship,
   (c) an arcuate scaled protractor having rectangular cross-section mounted on each of said supports in spaced relation thereto with its open end presented away from said beam,
   (d) a generally U-shaped block slidably mounted on each of said protractors having a reference point disposed in operative association with the scale on said protractor,
   (e) a radially inwardly projecting stop mounted on said block, and
   (f) means releasably retained in a fixed position on one end of said pipe and provided with a first member selectively engageable with said supports for axially locating said pipe with respect to said machine and a second member selectively engageable with said stops on said protractors for angularly orienting said pipe with respect to said bending machine.

8. In combination with a pipe bending machine having die means and a punch movable into engagement with a pipe supported on said die means for forming bends therein, an apparatus for locating a length of pipe relative to said machine, comprising
 (a) an elongated beam projecting outwardly from said machine,
 (b) means for adjustably retaining said beam in parallelism with said die means,
 (c) a plurality of pipe supports adjustably slidable along said beam,
 (d) the ends of said supports remote from said beam being disposed in coplanar relationship with each other and in alignment with said die means,
 (e) a protractor mounted on each of said supports in planes normal to the plane of said beam,
 (f) stop means adjustably slidable along each of said protractors, and
 (g) means releasably retained in a fixed position on one end of said pipe and provided with a first member selectively engageable with said ends of said supports for axially locating said pipe relative to said punch and die means and a second member selectively engageable with said stop means for angularly orienting said pipe relative to said punch and die means.

9. In combination with a pipe bending machine having die means and a punch movable into engagement with a pipe supported on said die means for forming bends therein, an apparatus for locating a length of pipe relative to said machine, comprising
 (a) an elongated beam projecting outwardly from said machine
 (b) a plurality of pipe supports adjustably slidable along said beam,
 (c) the ends of said supports remote from said beam having a generally V-shaped configuration for cradling said pipe thereon and being disposed in coplanar relationship with each other in alignment with said die means,
 (d) a protractor mounted on each of said supports in planes normal to the plane of said beam,
 (e) stop means adjustably slidable along each of said protractors, and
 (f) means releasably retained in a fixed position on one end of said pipe and provided with a first member selectively engageable with said ends of said supports for axially locating said pipe relative to said punch and die means and a second member selectively engageable with said stop means for angularly orienting said pipe relative to said punch and die means,
 (g) the periphery of said first member and the ends of said supports remote from the beam having mating faces for releasably retaining said first member on said supports.

References Cited in the file of this patent
UNITED STATES PATENTS

| | | |
|---|---|---|
| 1,610,193 | Battle | Dec. 7, 1926 |
| 1,778,981 | McLaughlin | Oct. 21, 1930 |
| 2,349,525 | St. Clair | May 23, 1944 |
| 2,785,477 | Gregory | Mar. 19, 1957 |
| 2,887,141 | Bower | May 19, 1959 |
| 2,998,838 | Byrd | Sept. 5, 1961 |

FOREIGN PATENTS

| | | |
|---|---|---|
| 155,378 | Australia | Feb. 23, 1954 |